US006798791B1

(12) United States Patent
Riazi et al.

(10) Patent No.: US 6,798,791 B1
(45) Date of Patent: Sep. 28, 2004

(54) CLUSTER FRAME SYNCHRONIZATION SCHEME FOR A SATELLITE DIGITAL AUDIO RADIO SYSTEM

(75) Inventors: Habib Riazi, Stafford, VA (US); Zulfiquar Sayeed, East Windsor, NJ (US); Dunmin Zheng, Vienna, VA (US)

(73) Assignee: Agere Systems Inc, Allentown, PA (US)

( * ) Notice: Subject to any disclaimer, the term of this patent is extended or adjusted under 35 U.S.C. 154(b) by 0 days.

(21) Appl. No.: 09/464,831

(22) Filed: Dec. 16, 1999

(51) Int. Cl.[7] ........................ H04B 7/185; H04B 7/212; H04B 7/216; H04Q 7/00; H04J 3/06

(52) U.S. Cl. ....................... 370/515; 370/350; 370/314; 370/347; 370/316; 370/335

(58) Field of Search ................................ 370/315, 316, 370/509, 510, 511, 512, 350, 535, 536, 485, 486, 487; 375/367, 366, 260, 299, 340, 365; 714/755, 776, 789; 348/555, 614, 725

(56) References Cited

U.S. PATENT DOCUMENTS 4,219,812 A * 8/1980 Rittenbach .................. 342/110
5,802,079 A * 9/1998 Wang ......................... 375/365
6,188,441 B1 * 2/2001 Limberg ..................... 348/555
6,263,505 B1 * 7/2001 Waalker et al. ............. 725/110
6,357,029 B1 * 3/2002 Sinha et al. ................ 714/752
6,363,061 B1 * 3/2002 Yuzawa ...................... 370/345
6,378,101 B1 * 4/2002 Sinha et al. ................ 714/755
6,501,810 B1 * 12/2002 Karim et al. ............... 375/369
6,526,107 B1 * 2/2003 Katoh et al. ................ 375/368
6,556,639 B1 * 4/2003 Goldston et al. ........... 375/365
6,564,003 B2 * 5/2003 Marko et al. ................. 386/69
6,574,338 B1 * 6/2003 Sachdev ..................... 380/212

* cited by examiner

*Primary Examiner*—Hanh Nguyen

(57) ABSTRACT

A satellite digital audio radio system (SDARS) transmitter provides a broadcast transmission signal including a time division multiplex (TDM) mode of transmission and a coded orthogonal frequency multiplex (OFDM) mode of transmission. The SDARS transmitter provides a transmission signal that supports four transport mechanisms or traffic channels: (1) multiple audio and data program channels (program channels), (2) a cluster control information channel (CC), (3) a global control information channel (GC), and (4) a synchronization channel (CS). In particular, the SDARS transmitter processes 100 program channels into 5 clusters, each cluster comprising GC and CS information, along with a program cluster comprising 20 program channels and CC information. The SDARS transmitter further partitions each cluster into 255 cluster segments and interleaves the cluster segments from each cluster for transmission. The SDARS uses one identical maximal length PN (pseudo-random number) sequence as a cluster synchronization word for the five clusters. The relative phases of five cluster correlation results is used by a receiver to uniquely identify each individual cluster.

16 Claims, 19 Drawing Sheets

Riazi-Sayeed-Zheng 5-13-5

Riazi-Sayeed-Zheng 5-13-5

Riazi-Sayeed-Zheng 5-13-5

Riazi-Sayeed-Zheng 5-13-5

Riazi-Sayeed-Zheng 5-13-5

Riazi-Sayeed-Zheng 5-13-5

Riazi-Sayeed-Zheng 5-13-5

$L1 + L2 + L3 + \ldots + L20 = 326$ RS Blocks/Program Cluster, where, Li = Number of RS blocks for Channel $i$, $1 \leq i \leq 20$ the number of RS blocks per channel, *Li*, is a random variable,
each RS word comprises 8 bits,
concatenated with a 2/3 convolutional encoder,
for each channel, there is a tail comprising 8 bits, Riazi-Sayeed-Zheng 5-13-5

Riazi-Sayeed-Zheng 5-13-5

Riazi-Sayeed-Zheng 5-13-5

Riazi-Sayeed-Zheng 5-13-5

150

Riazi-Sayeed-Zheng 5-13-5

Riazi-Sayeed-Zheng 5-13-5

Riazi-Sayeed-Zheng 5-13-5

Riazi-Sayeed-Zheng 5-13-5

Riazi-Sayeed-Zheng 5-13-5

Riazi-Sayeed-Zheng 5-13-5

Riazi-Sayeed-Zheng 5-13-5

Note: If differential channel delays are ensure within one half of transmission frame, then cluster synchronization can align three paths in time without ambiguity Riazi-Sayeed-Zheng 5-13-5

Riazi-Sayeed-Zheng 5-13-5

340

CLUSTER FRAME SYNCHRONIZATION SCHEME FOR A SATELLITE DIGITAL AUDIO RADIO SYSTEM

CROSS-REFERENCE TO RELATED APPLICATIONS

Related subject matter is disclosed in the co-pending, U.S. Patent applications of Zheng, Riazi, and Sayeed, entitled "A Transmission Frame Structure For A Satellite Digital Audio Radio System," application Ser. No. 09/464,574, filed on Dec. 16, 1999, now U.S. Pat. No. 6,618,367; and "Signaling Combining Scheme For Wireless Transmission Systems Having Multiple Modulation Schemes," application Ser. No. 09/428,732, filed on Oct. 28, 1999, now U.S. Pat. No. 6,580,705.

BACKGROUND OF THE INVENTION (1) Field of the Invention

This invention relates generally to communications and, more particularly, to satellite broadcast systems.

(2) Background

A proposed satellite digital audio radio system (SDARS) supports multiple audio and data program channels (program channels) for broadcasting CD-like music and talk shows to mobile and fixed receivers. Illustratively, the system provides for the transmission of 100 program channels.

Consequently, there is desired a transmission frame structure for efficient transport of these channels.

SUMMARY OF THE INVENTION

A transmission frame structure is presented for a satellite digital audio radio system (SDARS). An SDARS transmitter processes N program channels into M clusters of program channels, each cluster representing k program channels, where M>1, k>1, and $(M)(k)\leqq N$. The SDARS transmitter transmits a transmission signal representing the M clusters and including cluster synchronization information for each cluster such that the cluster synchronization information for each cluster is identical.

In an embodiment of the invention, a satellite digital audio radio system (SDARS) uses one identical maximal length PN (pseudo-random number) sequence as a cluster synchronization word for five clusters. The relative phases of five cluster correlation results is used by a receiver to uniquely identify each individual cluster.

In accordance with a feature of the invention, the above-mentioned five correlation results are combined to improve performance.

DETAILED DESCRIPTION

At this point, before describing the inventive concept, some background is provided on a satellite digital audio radio system (SDARS) configuration and transmission format. The section following this, entitled "Cluster Frame Synchronization" describes the inventive concept.

Satellite Digital Audio Radio System (SDARS)

Figure 1:
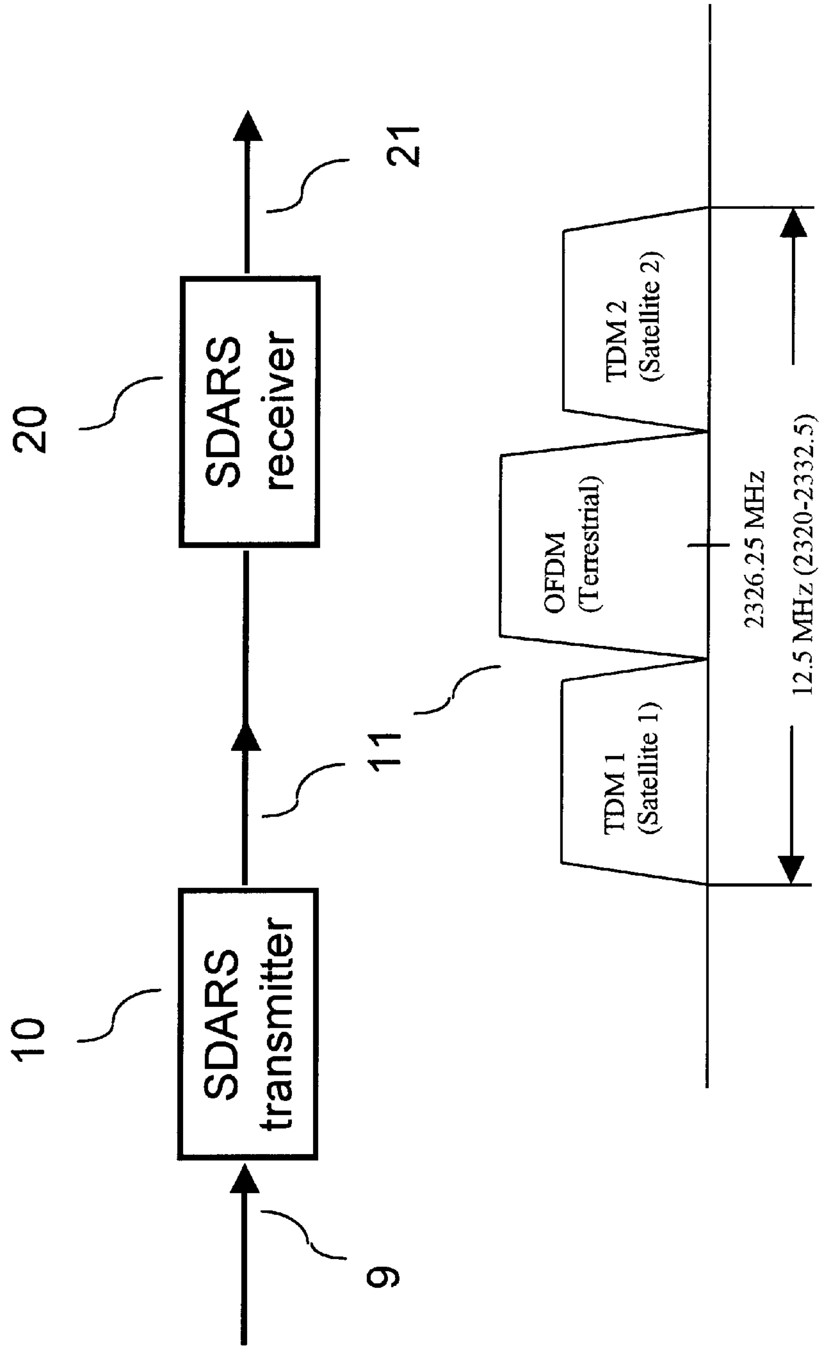
FIG. 1 shows an illustrative high-level block diagram of a satellite digital audio radio system.

The satellite digital audio radio system (SDARS) is a system for broadcasting CD-like music and talk shows to mobile and fixed receivers. An illustrative high-level block diagram of an SDARS is shown in FIG. 1. SDARS transmitter 10 receives a plurality of audio programs 9 (e.g., music, talk-shows) and provides a broadcast transmission signal 11 including a time division multiplex (TDM) mode of transmission and a coded orthogonal frequency multiplex (OFDM) mode of transmission. (OFDM and TDM modulation are known in the art and will not be described herein.) The total available bandwidth of 12.5 MHz (millions of hertz) is centered at 2326.25 MHz (the licensed S band) and is divided into three sub-band channels. Two satellite channels use the outer two sub-bands, each occupying a bandwidth of approximately 4.167 MHz. A single frequency network (SFN) terrestrial gap filler uses the middle sub-band and has a bandwidth of approximately 4.167 MHz. The combining of both TDM and OFDM modes provides for time, frequency, and space diversity. SDARS receiver 20 represents one of a number of receiving stations, for recovering (from the received signal) one or more audio programs 21 for listening pleasure. (For those interested, additional information on SDARS transmission using multiple modulation schemes is found in the above-mentioned co-pending, commonly assigned, U.S. Patent application of Riazi, Sayeed, and Zheng, entitled "Signal Combining Scheme For Wireless Transmission Systems Having Multiple Modulation Schemes.")

The SDARS supports four transport mechanisms, or traffic channels: (1) multiple audio and data program channels (program channels); (2) a cluster control information channel (CC); (3) a global control information channel (GC) and (4) a cluster synchronization channel (CS). As described further below, due to the nature of the data in different traffic channels, different levels of channel coding are applied to the GC, CC and the program channels to provide different levels of error correction.

Figure 2:
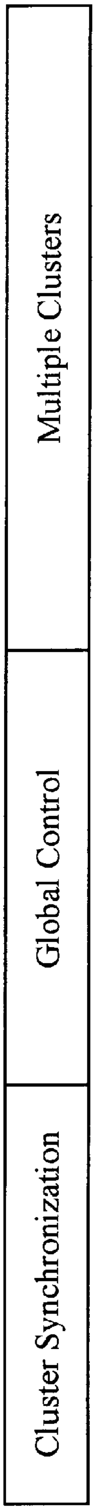
FIGS. 2, 3, and 4 conceptually illustrate a transmission frame format.
Figure 3:
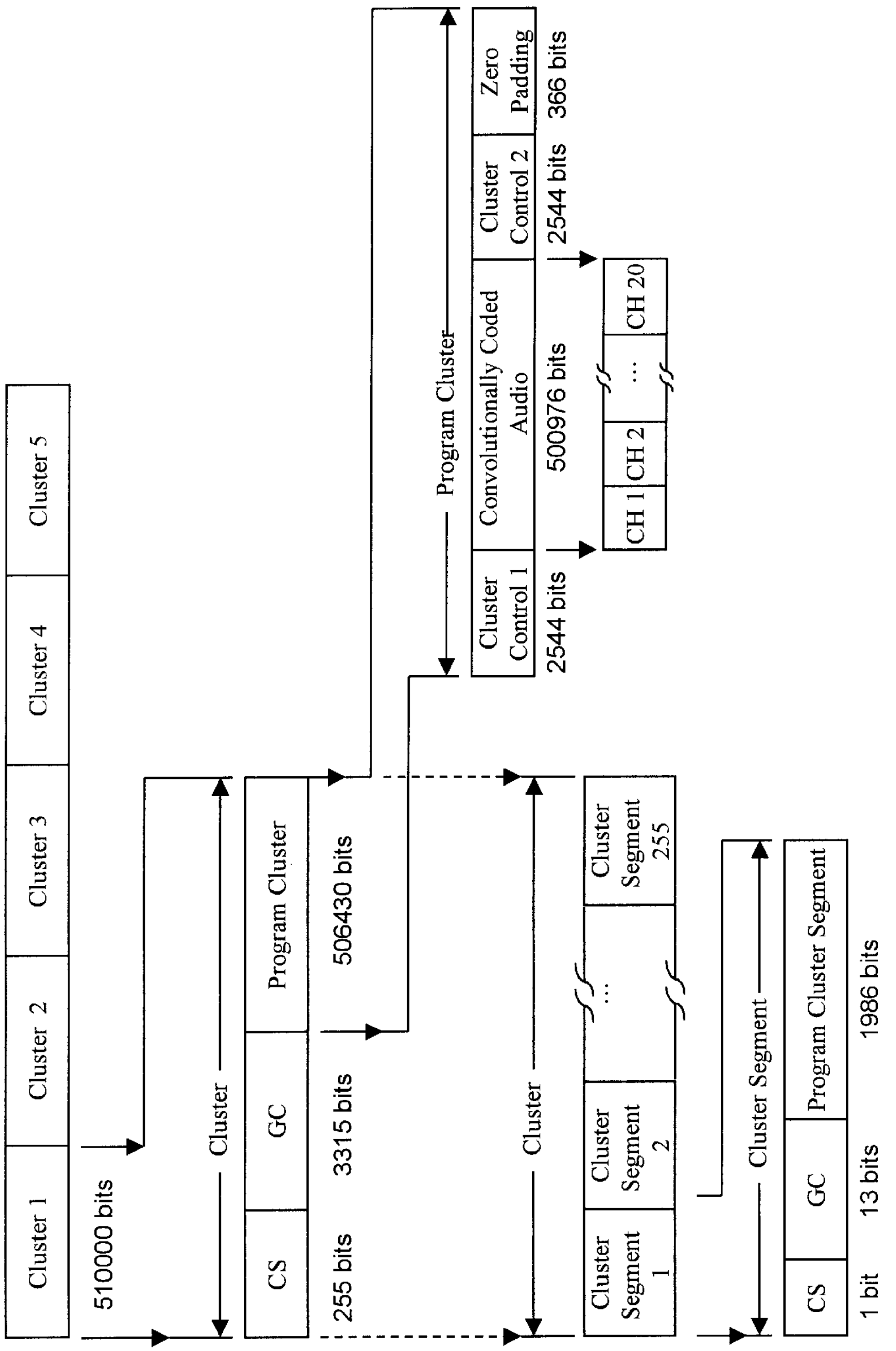
Figure 4:
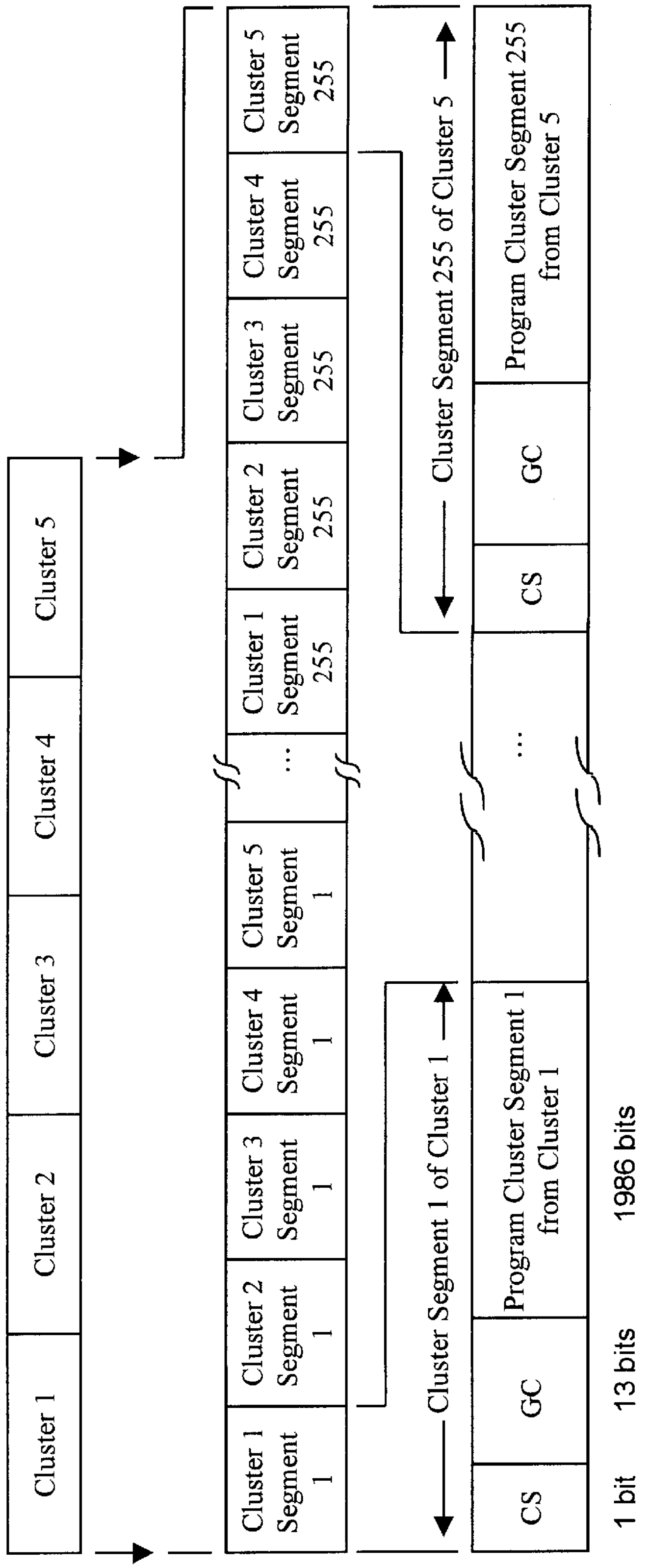

Before describing an actual transmission frame, attention should be directed to FIGS. 2–4, which conceptually illustrate a transmission frame format. As shown in FIG. 2, an SDARS transmitter (such as that shown in FIG. 1) transmits a frame of information comprising cluster synchronization information, global control information and multiple clusters (e.g., M clusters), each cluster of which conveys k program channels (which provides transmission for a total of N=(k)(M) program channels). (It should be noted that although illustrated in the context of each cluster conveying k program channels, other alternatives exist. For example, each cluster coveys at least k program channels, i.e., some clusters may convey more program channels such that $(k)(M)\leqq N$). To continue the example attention should now be directed to FIG. 3, where the frame of information previously shown in FIG. 2 is represented now as five "clusters" (i.e., M=5), where the global control information and the cluster synchronization information are now transmitted in portions of each cluster. (It should be noted that another term for cluster is a cluster frame.) Each cluster comprises one of the above-mentioned channels. In particular, each cluster comprises 510,000 bits (where a "bit" is a binary digit as known in the art) and is divided into a cluster synchronization (CS) field having 255 bits, a global control information (GC) field having 3315 bits, and a program cluster having 506,430 bits. The CS field is used for synchronization (described below) and the GC field is used for global control information (described below). With respect to the program cluster, each program cluster further comprises cluster control information (CC) (divided into a cluster control 1 field and a cluster control 2 field), convolutionally coded audio, and a zero padding field (all described further below). The convolutionally coded audio represents 20 program channels (i.e., k=20). Thus, five clusters (M=5) represent 100 program channels of information.

Although the SDARS transmitter forms clusters (each cluster comprising program channels, a CC channel, a GC channel and a CS channel), in terms of transmission each cluster is further divided into 255 cluster segments (as shown in FIG. 3), where each cluster segment comprises one bit from the CS field, 13 bits from the GC field and a program cluster segment, which is 1986 bits from the respective program cluster. (In other words, the CS field, the GC field and a program cluster are divided into 255 smaller portions, i.e., a CS field segment, a GC field segment and a program cluster segment, each of which is provided in a cluster segment.) To further illustrate this, transmission of cluster segments is illustrated in FIG. 4. As noted above, each cluster comprises 255 cluster segments. An SDAR transmitter interleaves the cluster segments from one cluster with those of other clusters. For example, and as shown in FIG. 4, the first cluster segment from each cluster is transmitted, then the second cluster segment from each cluster is transmitted, etc. As a result, cluster segments from the same cluster are spaced apart by at least 4 cluster segments (or M−1 cluster segments).

Figure 5:
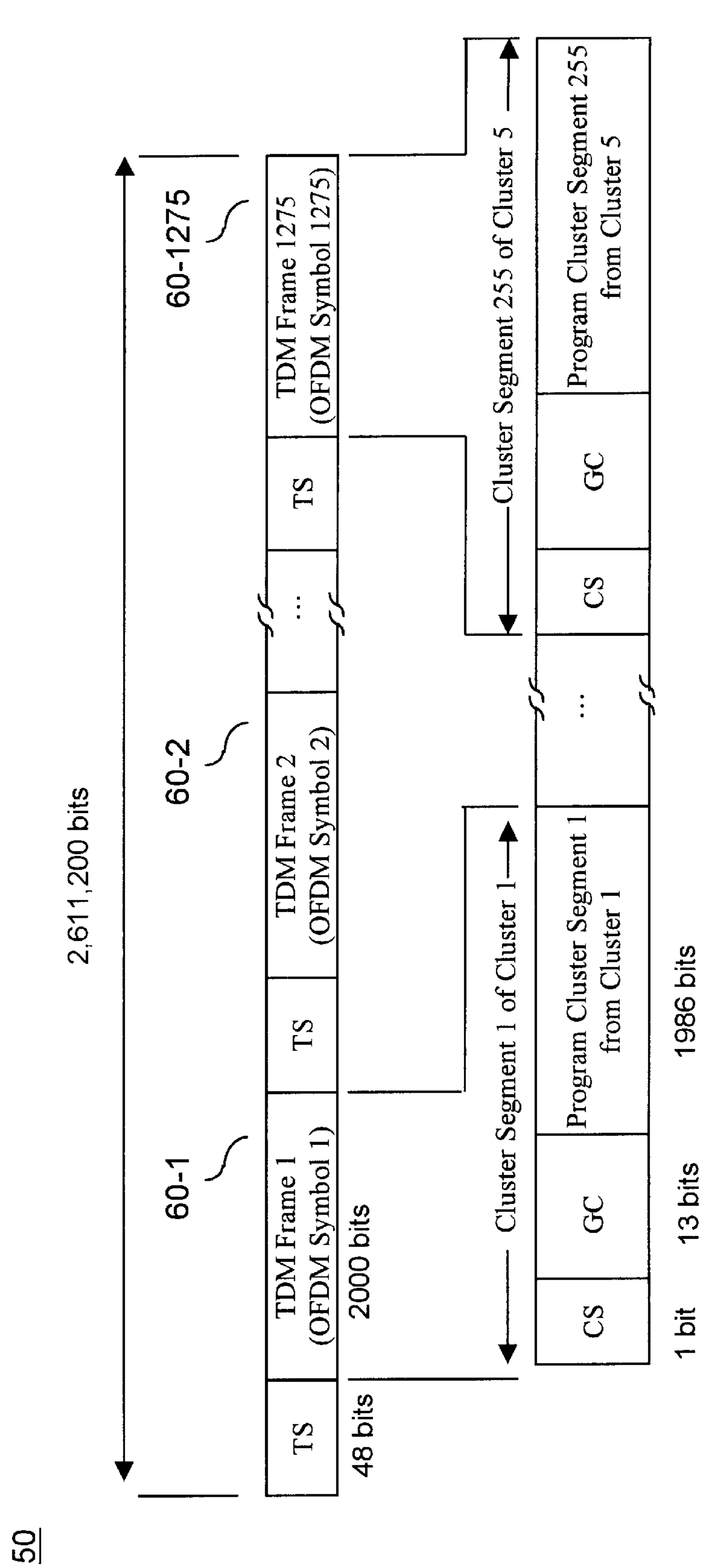
FIG. 5 shows an illustrative transmission frame format.

Turning now to FIG. 5, an illustrative transmission frame 50 is shown. As noted above, and shown in FIG. 1, for transmission TDM is used on two sub-bands and OFDM on the other sub-band. The transmission frame 50 is transmitted in parallel in each band. For the purposes of illustration, FIG. 5 illustrates the transmission frame for TDM. For OFDM simply delete the TS field (described below).

Transmission frame 50 multiplexes a number of TDM frames, illustrated in FIG. 5 as 60-1 through 60-n, where n is illustratively equal to 1275. (Each TDM frame also corresponds to one OFDM symbol.) Preceding every TDM frame is an equalizer training sequence (TS), comprising 48 bits. (Equalizer training sequences are known in the art and will not be described herein.) Each TDM frame (e.g., TDM frame 60-1) represents a cluster segment, as noted above and shown in FIG. 4. Each cluster segment comprises cluster synchronization (CS) bits, global control (GC) bits (which are coded (described below)) and a portion, or segment, of a program cluster (the bits of which are coded, scrambled and interleaved (described below)). (It should be noted that no TS exists for the OFDM transmission frame, which is the collection of OFDM symbols 1 through 1275 shown in FIG. 5.) Thus, transmission frame 50 multiplexes clusters of program channels. The total number of bits transmitted in transmission frame 50 is 2,611,200 for TDM and 2,550,000 for OFDM (sans the TS bits).

With respect to FIG. 5, the 48 bit TS field is inserted before every TDM frame. The 255 bits of the CS field is a maximal length PN (pseudo-random number) sequence (the generation of a pseudo-random number sequence is known in the art). It has been determined through simulations (not described herein) that using the same PN sequence for all five clusters is better in terms of performance and implementation. The CS bits for each cluster are inserted every M TDM frames, where M is equal to the number of clusters. For example, for cluster 1, a CS bit is inserted in TDM frames 1, 6, 11, etc., across the transmission frame when M=5 clusters. Whereas for cluster 2, a CS bit is inserted in TDM frames 2, 7, 12, etc. The one CS bit of each cluster segment occurs right after the TS field and is added after any scrambling and interleaving. CS bits are visible to the receiver for synchronization prior to descrambling and deinterleaving.

Figure 6:
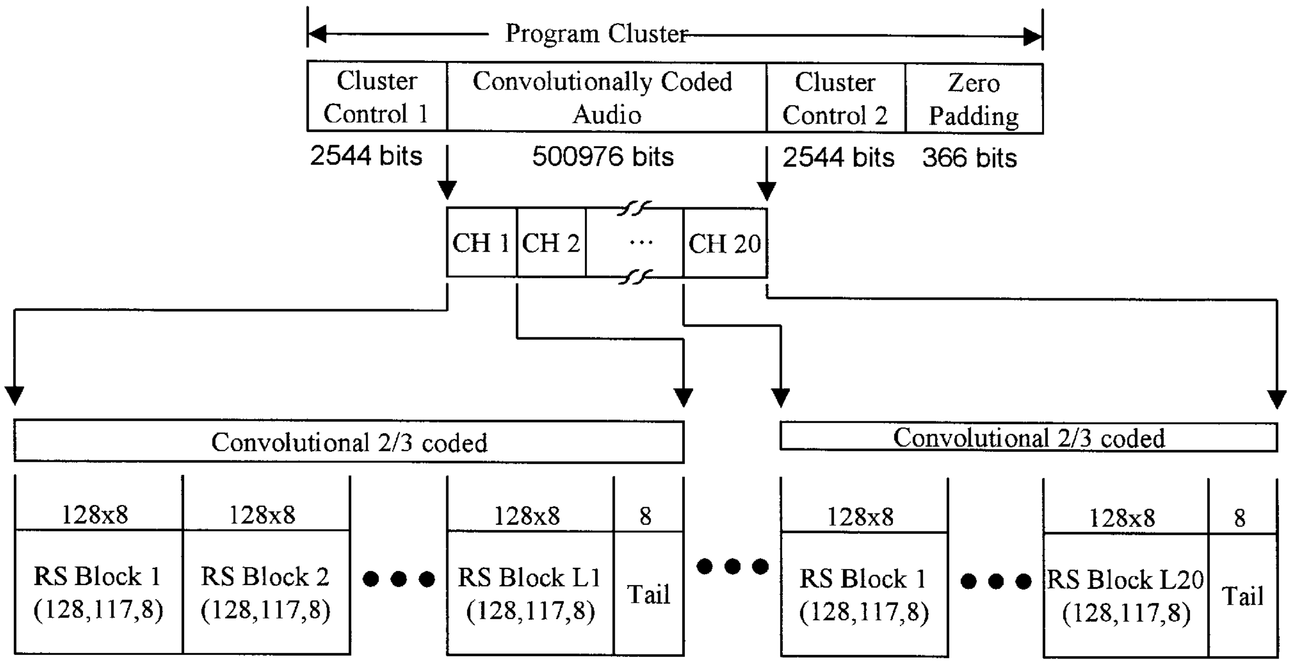
FIG. 6 shows an illustrative frame formats for a program cluster.

With respect to each program cluster, the transmission frame format is shown in more detail in FIG. 6. Concatenated coding is used for the Audio data. Audio data is Reed-Solomon (RS) encoded with an RS(128,117,8) code (the total number of symbols is 128, of which 117 carry information, and there are 8 bits per symbol). (It should be noted that the use of block coding (e.g., a Reed-Solomon (RS) code), convolutional coding and perceptual audio coding (PAC) are well known and will not be described herein.) As a result, there are (128)(8)=1024 bits in each RS word. (It should be noted that the RS code size must be chosen to fit one or only a few PAC data packets in order to allow for concealment techniques, built into a PAC coder (not shown) to function when errors occur.) An RS(128,117,8) code corrects 5 RS symbols or 40 bits. For each program channel of a program cluster an integer number Li (where $1\leqq i\leqq 20$) of RS code words is generated. These RS codewords are fed into a rate ⅔ punctured convolutional encoder. The number of RS code words, Li, per channel is a random variable since a PAC codec (coder/encoder) delivers a variable bit rate. The average number of RS code words is 16.3 per channel. A tail insertion (e.g., inserting zeroes) is performed for each channel to flush the encoder so that the trellis always starts at the zero state for the next set of RS Blocks. The 366 bits of zero-padding for each program cluster is needed in order to have an integral number of OFDM symbols and TDM bursts per cluster. The integral number must be equal to the number of cluster synchronization bits per cluster. (It should be noted that the zero-padding bits may be replaced by cluster encryption synchronization bits when encryption is used for a cluster.)

Figure 7:
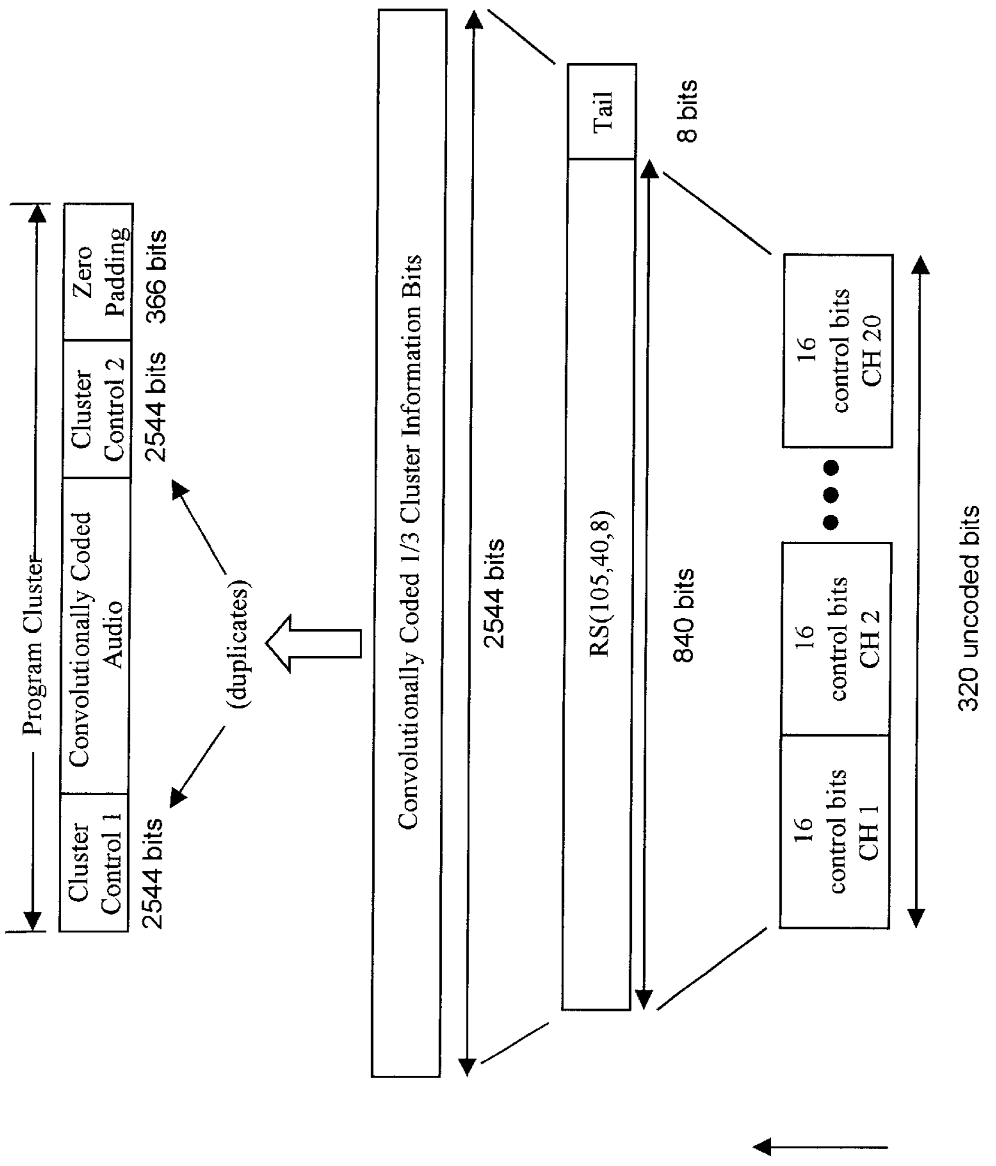
FIG. 7 shows an illustrative mapping for cluster control information.

As noted from FIGS. 3 and 6, the program cluster also comprises cluster control information fields, i.e., cluster control 1 and cluster control 2. The mapping of cluster control information is illustrated in FIG. 7. Cluster control information is used by a corresponding receiver for decoding a program channel from a program cluster (e.g., informing the receiver that channel 1 comprises Li=15 RS blocks, etc.). As shown in FIG. 7, there are 320 uncoded cluster control information bits for 20 channels per program cluster (16 control bits for each channel). The 230 uncoded cluster control information bits are encoded with an RS(105,40,8) code, which provides 840 bits to which a tail of 8 bits is added (e.g., 8 zero bits). The RS-encoded bits and the tail (which provides a total of 848 bits) is further coded with a rate ⅓ convolutional code that provides better protection for this important information. The resulting encoded 2544 bits are provided to both the cluster control 1 field and the cluster control 2 field of a program cluster. That is, each program cluster has duplicate header and trailer cluster control fields.

Figure 8:
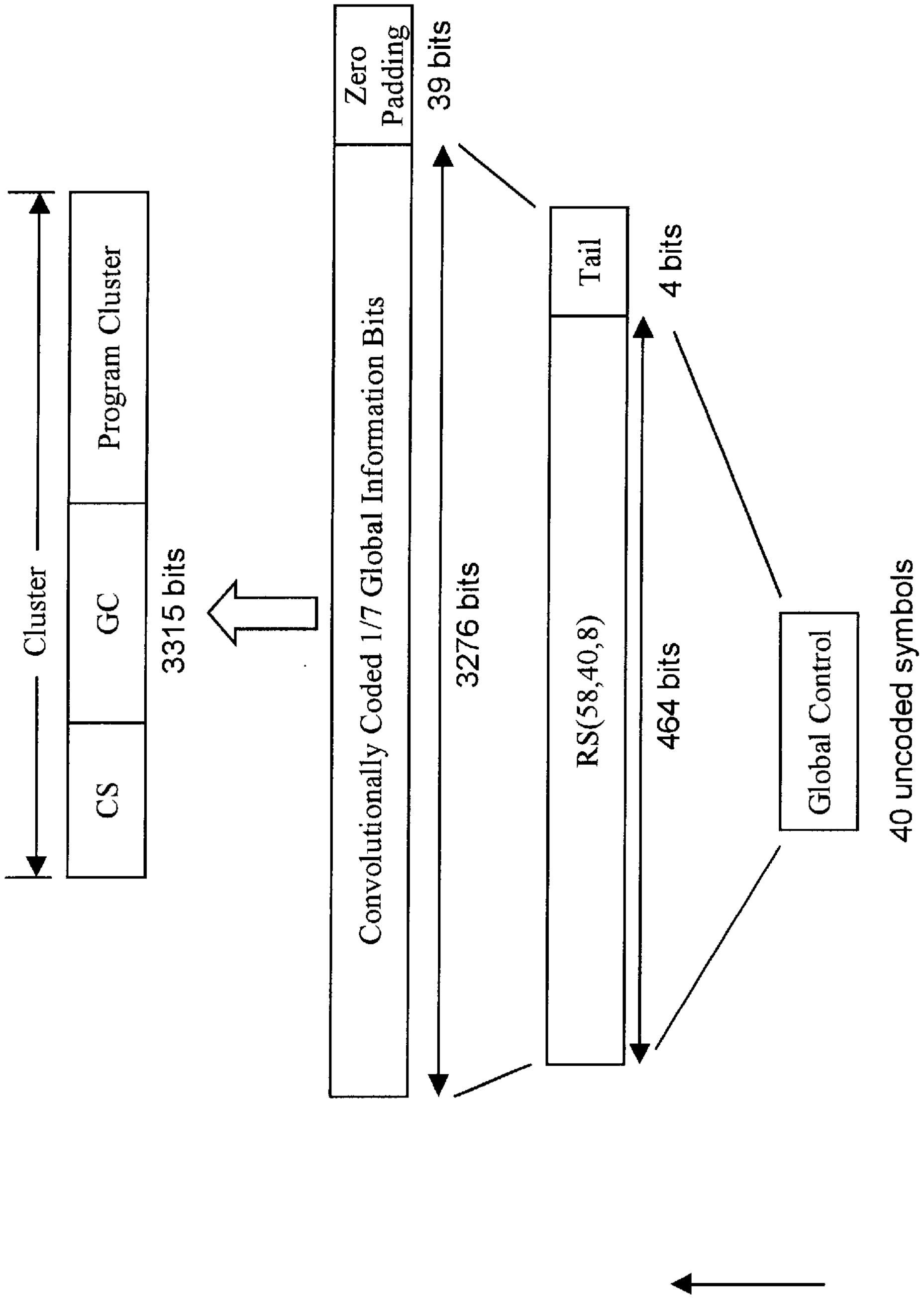
FIG. 8 shows an illustrative mapping for global control information.

As noted from FIG. 3, the GC field conveys global control information and comprises 3315 bits. The mapping of global control information is shown in FIG. 8. There are 40 uncoded global control symbols (or 320 bits). Concatenated coding is used for the GC data. These 40 uncoded symbols are encoded with an RS(58,40,8) code, which provides 464 bits to which a tail of 4 bits is added. The RS-encoded bits and the tail (which provide a total of 468 bits) is further coded with a rate 1/7 convolutional code, which results in 3276 bits. As noted above, the GC bits are divided among the 255 cluster segments of a cluster by transmitting 13 bits in each cluster segment right after the cluster synchronization bit in each TDM frame or OFDM symbol. Consequently, 39 bits of zero-padding must be added to the 3276 bits (i.e., 3276 divided by 255 is not an integer).

Figure 9:
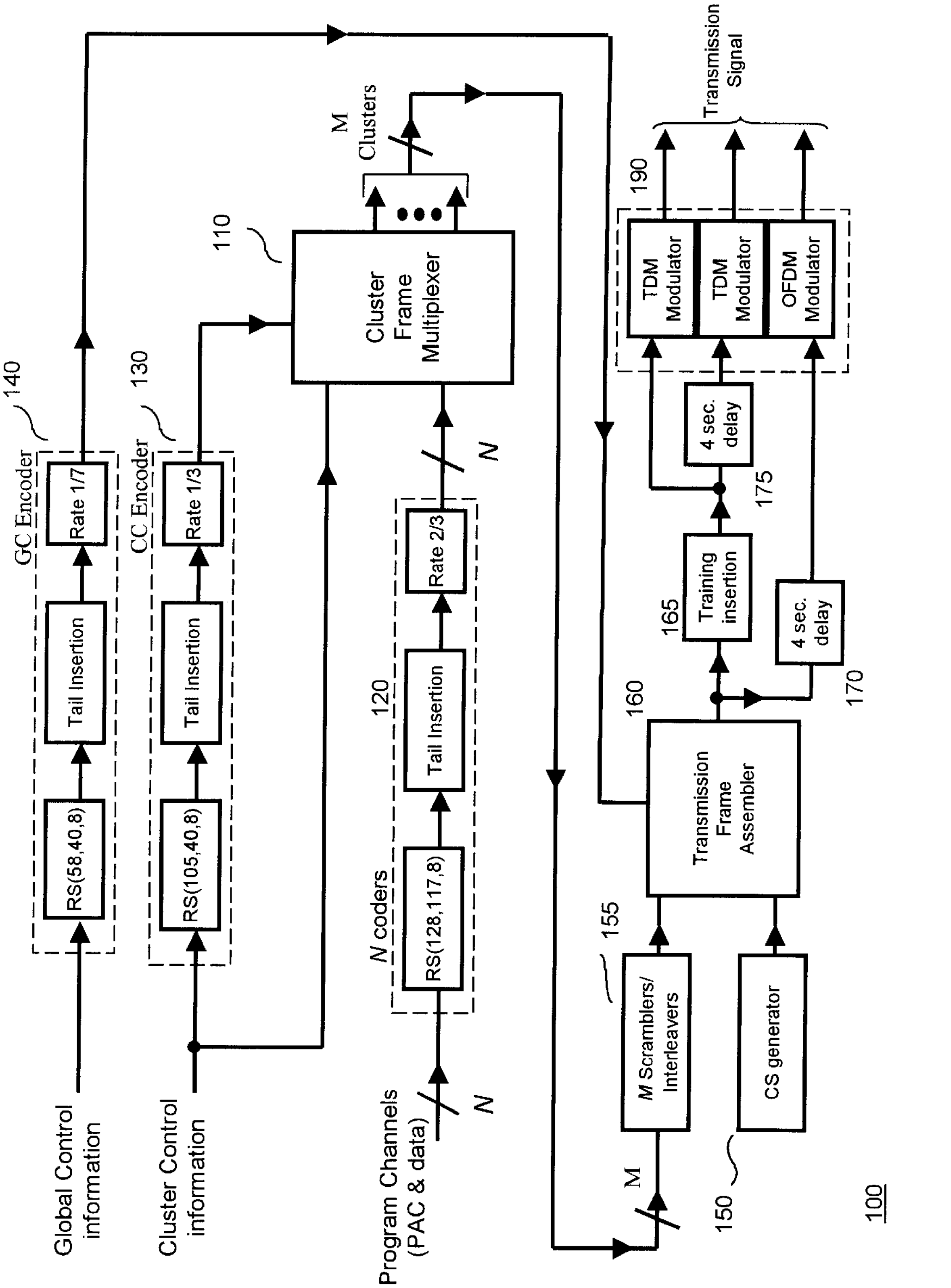
FIG. 9 shows an illustrative high-level block diagram of a satellite digital audio radio system transmitter in accordance with the principles of the invention.

Turning now to FIG. 9, an illustrative SDARS transmitter 100 is shown. Other than the inventive concept, the elements shown in FIG. 9 are well-known and will not be described in detail. As noted above, the SDARS supports four transport mechanisms, or traffic channels: (1) multiple, e.g., N, audio and data program channels (program channels), which are encoded by coder 120 (representing N coders); (2) a cluster control information channel (CC) encoded by CC encoder 130, (3) a global control information channel (GC) encoded by GC encoder 140 and (4) a synchronization channel (CS) provided by CS generator 150. As already noted, due to the nature of the data in different traffic channels, different levels of channel coding are applied to the GC, CC and the channels to provide different levels of error correction.

Global control information is encoded by GC encoder 140. Global control information is necessary to interpret the configuration of a transmission frame. This includes a variety of information, such as, but not limited to, any one or more of the following:: cluster identification; the number of active program channels; the number of coding-clusters; transmission parameters (e.g., UEP (Unequal Error Protection), cluster frame length) for each cluster, program type (audio or data); active transmission modes (multi-descriptive coding, CPPC (Complement Paired Punctured Convolutional) code or other form of code combining) and related parameters for each program channel. (It should be noted that other types of information may be included in global control information such as access control management information (not shown).) Compared with the program channels, the bit rate of the GC channel is much lower. As such, it is coded with a more powerful code. Illustratively, an RS (58,40,8) is used for the outer code and a rate 1/7 convolutional code with constraint length of 5 as the inner code. The output signal of the GC encoder is provided to transmission frame assembler 160 (described below).

Cluster control information is processed by CC encoder 130. As noted above, cluster control information comprises information about the number of blocks of Reed-Solomon code-length for each program channel and control data for identifying the location of program channels in the multiplexed frame. Each transmission frame is made of a sequence of interleaved cluster segments (equivalently interleaved cluster frames). There are 320 uncoded cluster control information bits for each cluster (i.e., 16 bits per channel). Since the cluster control information is critical to correctly decode each program channel in a cluster, a stronger code is used (compared to that used in the case of a program channel). Illustratively, an RS (105,40,8) is used for the outer code and a rate ⅓ convolutional code with constraint length of 9 as the inner code. Cluster control information also controls the operation of cluster frame multiplexer 110 for forming each of the M clusters. Since each cluster comprises encoded cluster control information, the output signal from CC encoder 130 is also applied to cluster frame multiplexer 110.

N program channels are applied to a bank of N coders, 120. The output signals from the bank of N coders, 120 are applied to cluster frame multiplexer 110. For the purposes of illustration, it is assumed that N=100 and each program channel represents audio (music and/or voice) and/or data signals. Further, it is assumed that 50 of the program channels represent, e.g., music, each such program channel averaging 64 kbps (thousands of bits per second) and the remaining 50 program channels represent, e.g., speech, each such program channel averaging 24 kbps. As shown in FIGS. 6 and 9, for each coder, the RS block size is 128 symbols (128*8=1024 bits). The RS (128,117) code gives 5 symbols (40 bits) of error correction capability Convolutional coding is given by K=9, rate ⅔ (obtained by puncturing a mother rate ½ code with puncturing pattern as 1011).

Before continuing with a description of FIG. 9, the following should be noted. As shown in FIG. 6, 20 program channels are assigned to each cluster, which is a fixed, or constant, capacity channel. As such, the same number of RS blocks could be used to transmit each program channel within a cluster. (Here, this is illustratively 16.3 RS blocks per program channel.) However, and as noted above, a PAC coding scheme, by itself, provides a variable bit rate. In other words, for many of the program channels the instantaneous bit demand may be substantially higher than an average bit rate for some fraction of time. This leads to two concerns. One concern is that a constant bit rate needs to be maintained to the block of coders, 120. This can be solved by using suitable buffering and rate control techniques as known in the art (not shown). The second concern is that some program channels may instantaneously require more bits for transmission than other program channels. If a fixed number of RS blocks are used for each of the 20 program channels, than some program channels would experience an "under-run" (i.e., less that 16.3 RS blocks are required at a particular instant of time, thus wasting bandwidth) while other program channels would experience an "over-run" (i.e., more than 16.3 RS blocks are required at a particular instant of time, thus requiring additional bandwidth). Although not necessary to the inventive concept, it may be advantageous to perform perceptual audio coding of the program channels using a noise allocation strategy whereby for each program channel the bit requirement is computed based on a perceptual model (not shown). This is known as statistical joint bit allocation. In statistical joint bit allocation, bits (i.e., bandwidth) are allocated to a program channel from a common bit pool. Here, the common bit pool is a program cluster comprising 326 RS blocks. As illustrated in FIG. 6, a program channel comprises Li RS blocks, where Li is a random variable taken from the pool of 326 RS blocks. This allows for bandwidth to be channeled from a less demanding program channel to a more demanding one on an instantaneous basis. Therefore, statistical joint bit allocation reduces the degree of "under-coding" to a negligible level while a constant bit rate is maintained. In statistical joint bit allocation, an entire transmission frame of PAC packets is buffered and stored (not shown) for each of the five clusters together with the cluster control information before RS encoding. (Conversely, as stated above, the same number of RS blocks could be used for each program channel. However, this would probably lead to more "over-runs" and "under-runs.")

Returning to FIG. 9, the 20 encoded program channels for each cluster are then multiplexed together with the duplicate header and trailer cluster control fields in cluster frame multiplexer 110. The latter is controlled by the cluster control information signal. Cluster frame multiplexer 100 provides M clusters to a corresponding bank of M scramblers and interleavers 155, which scramble and interleaves each cluster and provides M scrambled and interleaved output signals to transmission frame assembler 160.

Figure 10:
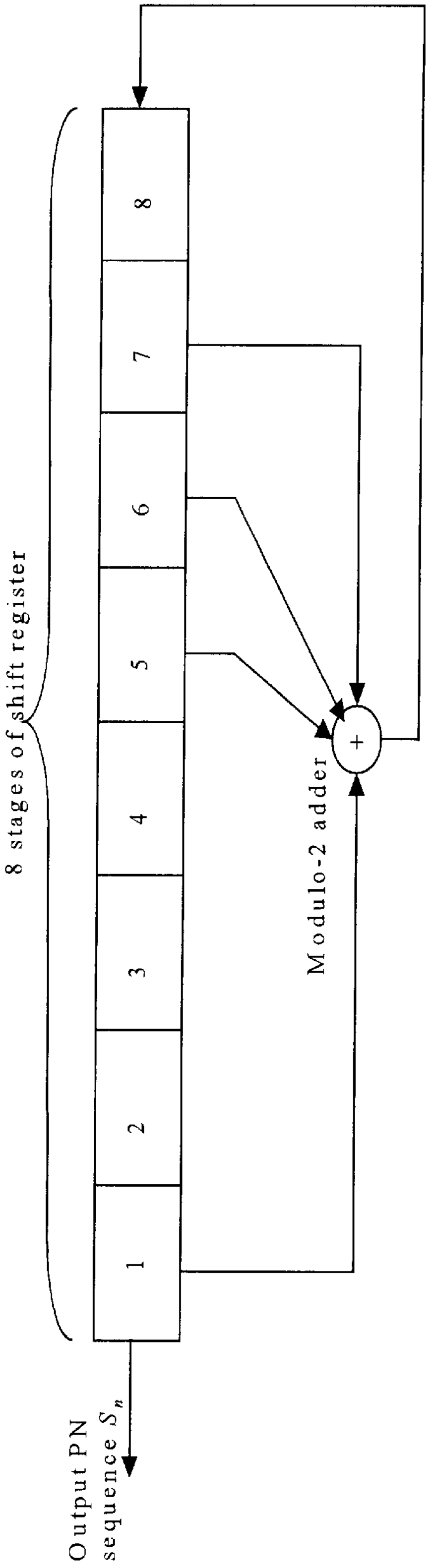
FIG. 10 shows an illustrative block diagram of a cluster synchronization generator for use in the transmitter of FIG. 9.

CS generator 150 provides the CS channel, which is used for internally within the system for transmission frame and cluster synchronization, carrier synchronization, and channel state estimation. Other than cluster frame synchronization, synchronization techniques and channel state estimation are well-known and will not be described further herein. An illustrative technique for cluster frame synchronization is described in the above-mentioned, co-pending, commonly assigned, U.S. Patent applications of Zheng, Riazi, and Sayeed, entitled "A Cluster Frame Synchronization Scheme For A Satellite Digital Audio Radio System." Turning briefly to FIG. 10, an illustrative CS generator 150 is shown. CS generator 150 comprises an 8-stage linear feedback shift registers. The output signal from CS generator 150 is applied to transmission frame assembler 160.

Returning to FIG. 9, Transmission frame assemble 160 multiplexes the coded global control bits from GC encoder 140, the CS bits from CS generator 150 and the M clusters to form a transmission frame, as illustrated above in FIG. 5 (except for the TS field). The transmission frame is modulated for transmission via modulator 190. In this example, modulator 190 comprises three types of modulation. In particular, the output signal from transmission frame assembler 160 is passed through 4 second (sec.) delay element 170 for application to an OFDM modulator of modulator 190. (It should be noted that the 4 second delay is merely illustrative. Indeed, in some systems embodying the inventive concept a delay may not even be necessary.) Similarly, the output signal is passed through training insertion element 165, which inserts the TS field for the TDM signal (as shown in FIG. 5). The output signal from training insertion element 165 is applied to two TDM modulators of modulator 190 (one of which first passes through 4 sec. delay element 175).

In other words, the whole transmission frame is fed to the TDM modulator of a Satellite 1 (not shown), and a delayed version is sent to the TDM modulator of a Satellite 2 (not shown) and the OFDM modulators of terrestrial repeaters (not shown) in a single frequency network (SFN). The delayed path ensures that no service disruption occurs when a mobile receiver (not shown) travels through an underpass, where the signal blockage may last up to a few seconds. The TDM signal is QPSK (quadrature phase shift keying) modulated. The OFDM signal is created by operating IFFT (inverse fast fourier transforms) over DQPSK (differential quadrature phase shift-keying) modulated data. A guard interval is inserted into the signal to avoid the multipath effect of the Rayleigh channel on the OFDM symbol (i.e., the missing TS bits of an OFDM frame). The transmission link for the TDM signal consists of satellite transponders and Ricean channels in a rural area, while for the OFDM signal it includes terrestrial repeaters and SFN in Rayleigh channels in an urban area.

Referring back to FIG. 5, each TDM frame or OFDM symbol has a total of 2000 bits that include 1 CS bit, 13 bits of coded global control information and 1986 bits of interleaved audio for the cluster. The total number of bits in the data transmission frame is 2,550,000 bits (not include the 48 bit TS fields).

Figure 11:
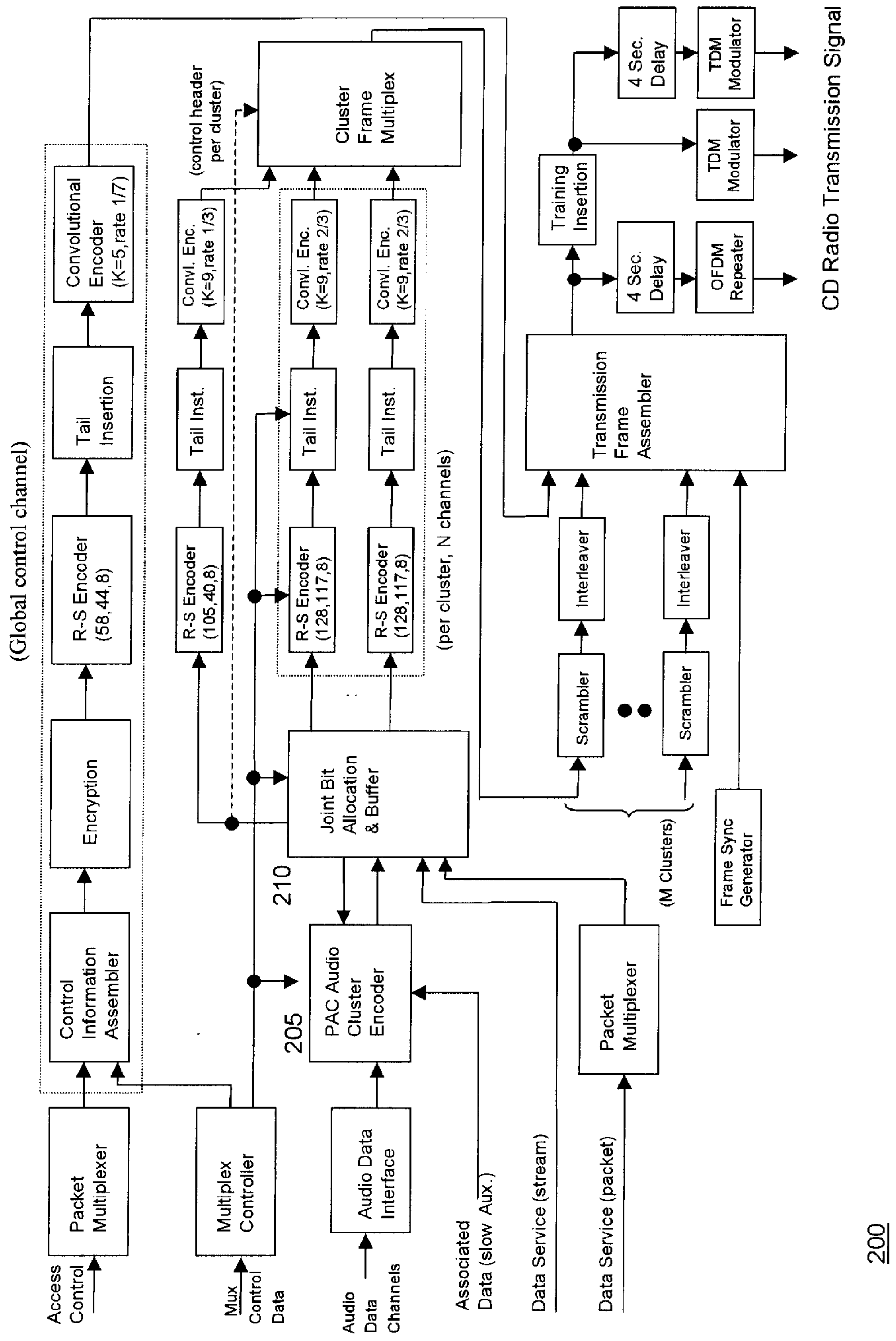
FIG. 11 shows another illustrative block diagram of a satellite digital audio radio system transmitter in accordance with the principles of the invention.

Turning to FIG. 11, a more detailed block diagram of another illustrative SDARS transmitter 200 is shown. Other than the inventive concept, the elements shown in FIG. 11 are well-known and will not be described in detail. As can be observed, FIG. 11 is similar to FIG. 9. For illustration purposes, the SDARS transmitter of FIG. 11 illustrates a PAC audio cluster encoder 205 (which performs PAC encoding of the program channels) coupled to a joint bit allocation & buffer element 210 (joint bit allocation was described above). As noted above, joint bit allocation & buffer element 210 buffers and stores an entire transmission frame and controls PAC audio cluster encoder 205.

It should be noted that the illustrated transmission frame structure is easily modified for having different numbers of program channels in a program cluster and underlying RS coding scheme. The program cluster can also be divided into subclusters. For example, the program cluster could be divided into two subclusters such that one subcluster is for fixed rate channels and the other subcluster is for variable rate channels. In this situation, joint bit allocation encoding only needs to be performed within the subcluster that contains variable bit rate channels. Also, it should be noted that RS-coding can be performed across multiple channels.. RS-coding across multiple channels spreads burst errors from uncorrectable RS blocks across multiple channels and, thus, reduces the size of a burst error on an individual channel and improves the performance of error concealment. Subclusters and RS-coding across multiple channels only require modification of the cluster control information channel coding based on the proposed frame structure. This is because the cluster control information bits may vary with subclusters and multiple channels RS-coding schemes.

As described above, an illustrative transmission frame structure for a satellite digital audio radio system was presented. This illustrative frame structure is suitable for both a TDM mode of transmission from two satellites and an OFDM mode of transmission from terrestrial gap fillers. The frame structure provides a unique format for the transmission of multiple audio and data programs.

Cluster Frame Synchronization

For the satellite signal, TDM frame and timing synchronization is based on a correlation for detection of the above-mentioned training sequence (TS). The TDM acquisition includes acquisition of time, frame, carrier synchronization and acquisition of the equalizer coefficients. For the terrestrial repeater signal, OFDM frame and timing synchronization is based on the GIB (Guard Interval Based) carrier tracking and timing recovery algorithm. The OFDM acquisition includes acquisition of time, frame, and carrier synchronization. As used herein, this is referred to as timing/frame and carrier synchronization. Algorithms for timing/frame and carrier synchronization are known in the art (e.g., see John G. Proakis, "*Digital Communications,*" McGraw-Hill, third Edition, 1995; Heinrich Meyr et al, "*Digital*

*Communication Receivers,"* John Wiley & Sons, 1998; and J. V. Beek, M. Sandell and P. O. Boijesson, "ML estimation of time and frequency offset in OFDM systems," *IEEE Transactions on Signal Processing,* Vol. 45, No. 7, July 1997, pp 1800–1805). Since the above-described frame structure (e.g., see FIG. 5), ensures that one TDM frame fits into one OFDM symbol, cluster synchronization bits of the CS channel for both TDM and OFDM paths are readily identified once the timing/frame and carrier synchronization is acquired.

The CS channel enables a receiver to acquire cluster synchronization in order to compensate for differential channel propagation delays, identify an individual cluster frame from the received data stream, identify the global control channel and to synchronize a cluster deinterleaver. As noted earlier, the CS field (e.g., see FIG. 3) is a 255 bits maximal length PN sequence. For performance and implementation reasons, all clusters use the same PN sequence as sync words.

Figure 12:
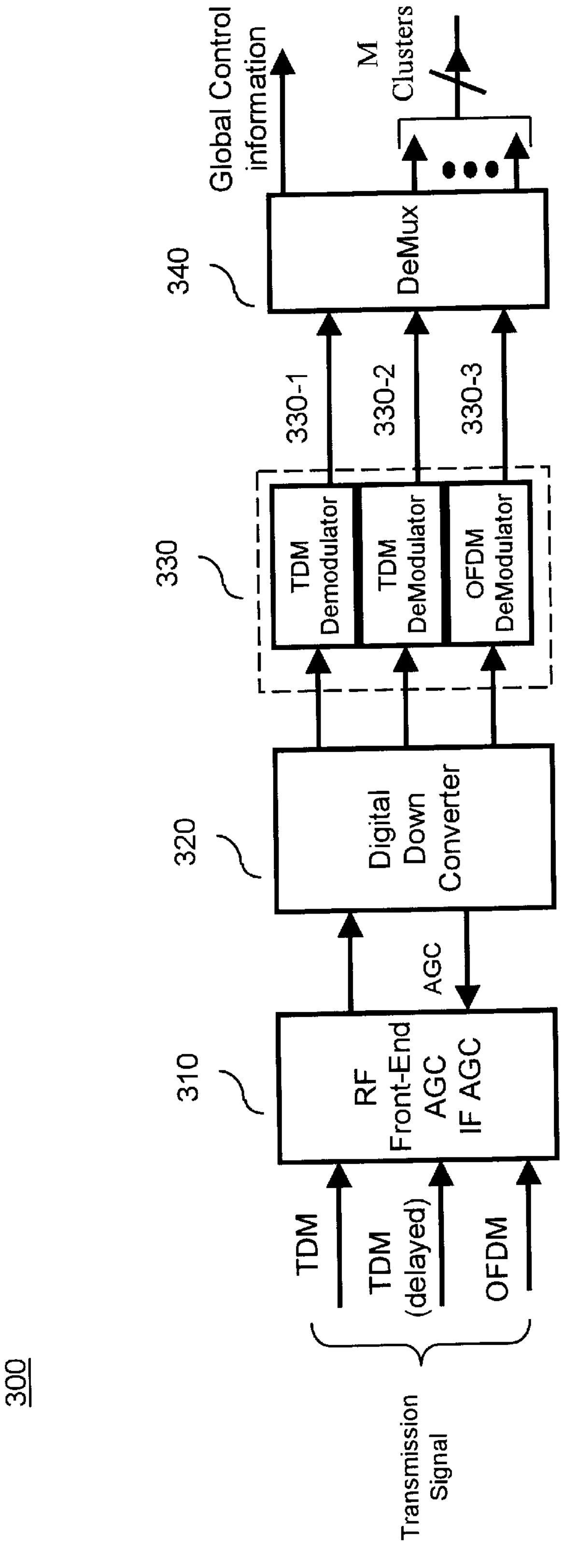
FIG. 12 shows an illustrative block diagram of a satellite digital audio radio system receiver in accordance with the principles of the invention.

An illustrative receiver 300 in accordance with the principles of the invention is shown in FIG. 12. Other than the inventive concept, the elements of receiver 300 are well known and will not be described in detail. Receiver 300 comprises RF front end 310, which includes AGC (automatic gain control) and IF (intermediate frequency) AGC. The transmission signal, (e.g., TDM and OFDM signals) are received at RF front end 310, and are sampled at an IF with a single ADC (analog-to-digital converter) (not shown). RF front end 310 is coupled to digital down converter 320, which down converts the signals as known in the art to base-band signal streams (it is presumed that digital down converter 320 also includes timing error and frequency offset compensation). The three separated base-band signal streams (TDM, TDM (delayed), and OFDM) are fed to the corresponding TDM demodulators and OFDM demodulator of demodulator element 330. The TDM demodulators include matched filters, frame synchronizer, carrier synchronizer, DFE equalizer and noise variance estimator as known in the art. The OFDM demodulator contains frequency-offset compensation, GIB carrier and timing synchronization, OFDM demodulation and DQPSK demodulation as known in the art. The demodulated signals (330-1, 330-2, and 330-3) are applied to DeMux 340 (described below), which recovers M clusters of information and the global information channel (these are encoded versions). Since the inventive concept concerns cluster (or cluster frame) synchronization, other elements of the receiver are not shown such as concatenated channel decoding chains to complement the coding performed in an SDARS transmitter (such as that shown in FIGS. 9 and 11) for both program channels and global control information. (For those interested, additional information on an SDARS receiver receiving multiple modulation schemes, and using a technique such as MRC (maximal ratio combining), is found in the above-mentioned co-pending, commonly assigned, U.S. Patent application of Riazi, Sayeed, and Zheng, entitled "Signal Combining Scheme For Wireless Transmission Systems Having Multiple Modulation Schemes." It should also be noted that instead of combining the received signals via, e.g., an MRC technique, a receiver can simply use the strongest received signal (e.g., using signal-to-noise ratio (SNR) as a criteria).)

Figure 13:
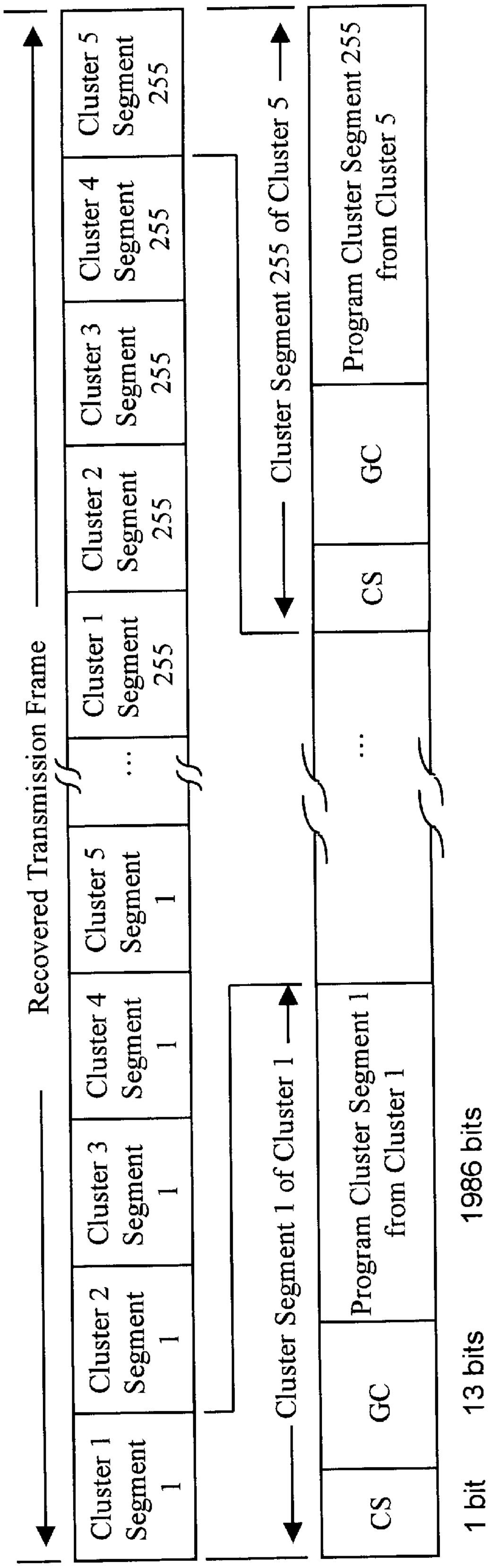
FIG. 13 shows an illustrative recovered transmission frame.

Turning now to FIG. 13, an illustrative block diagram of a portion of the recovered data stream after demodulator element 330 is shown (this is representative of each of the demodulator output signals 330-1, 330-2, and 330-3). (It should be observed that FIG. 13 is similar to FIG. 4, described above.) These demodulated signals are applied to DeMux 340, which is shown in illustrative detail in FIG. 14.

DeMux 340 comprises three identical elements: 340-1, 340-2 and 340-3, for processing a respective one of the demodulator 330 output signals. Since each element is identical, only element 340-1 is described herein. Output signal 330-1 is applied to frame demultiplexer (demux) 405, which separates the CS channel, the GC channel and the clusters of program channels (cluster data) for the TDM transmission path. The CS channel is applied to CS demultiplexer (demux) 410, which separates the CS bits for each of the M clusters (here, illustratively M=5). (As shown in FIG. 4, one bit of the 255 bit cluster synchronization word for each cluster is inserted into every five TDM frames or OFDM symbols across the transmission frame. The TDM frames or OFDM symbols for different clusters appear in the transmission frame, alternatively from cluster 1 to cluster 5.)

As already indicated, the CS field is a 255 bits maximal length PN sequence, which has a very good auto-correlation characteristic. The auto correlation function of a periodic PN sequence can be defined in terms of PN sequence $\{S_n\}$ as:

$$R_m = \sum S_n S_{n+m,}; \quad 0 \le m \le L-1 \tag{1}$$

where L is the period of the sequence (here, equal to 255). Since the sequence $\{S_n\}$ is periodic with period L, the auto-correlation sequence is also periodic with period L. A PN sequence usually has an auto-correlation function that has correlation properties similar to white noise. Therefore, the peak of the correlation result can tell starting position of a cluster, or cluster frame. To identify five different clusters, one may need to use five different cluster synchronization words (PN sequences). However, the cross-correlation among five PN sequences due to imperfect orthogonality may cause degradation of the performance. Therefore, and in accordance with the invention, one identical cluster synchronization word is used for all five clusters. As such, in order to identify an individual cluster, it is necessary to have five parallel correlators that perform correlation on each of the five received cluster synchronization bits streams. Therefore, each recovered cluster synchronization word from CS demux 410 is applied to a respective correlator of correlation element 415. The input signal, $Y_n$, of a respective correlator can be modeled as:

$$Y_n = A_n S_n + N_n; \tag{2}$$

where $A_n$, $S_n$ and $N_n$ represent receive cluster synchronization signal amplitude, bit value and noise, respectively. The output signal of a respective correlator, $C_m$, is given by:

$$C_m = \sum_{n=1}^{L} Y_{m-n} S_n, \tag{3}$$

Figure 14:
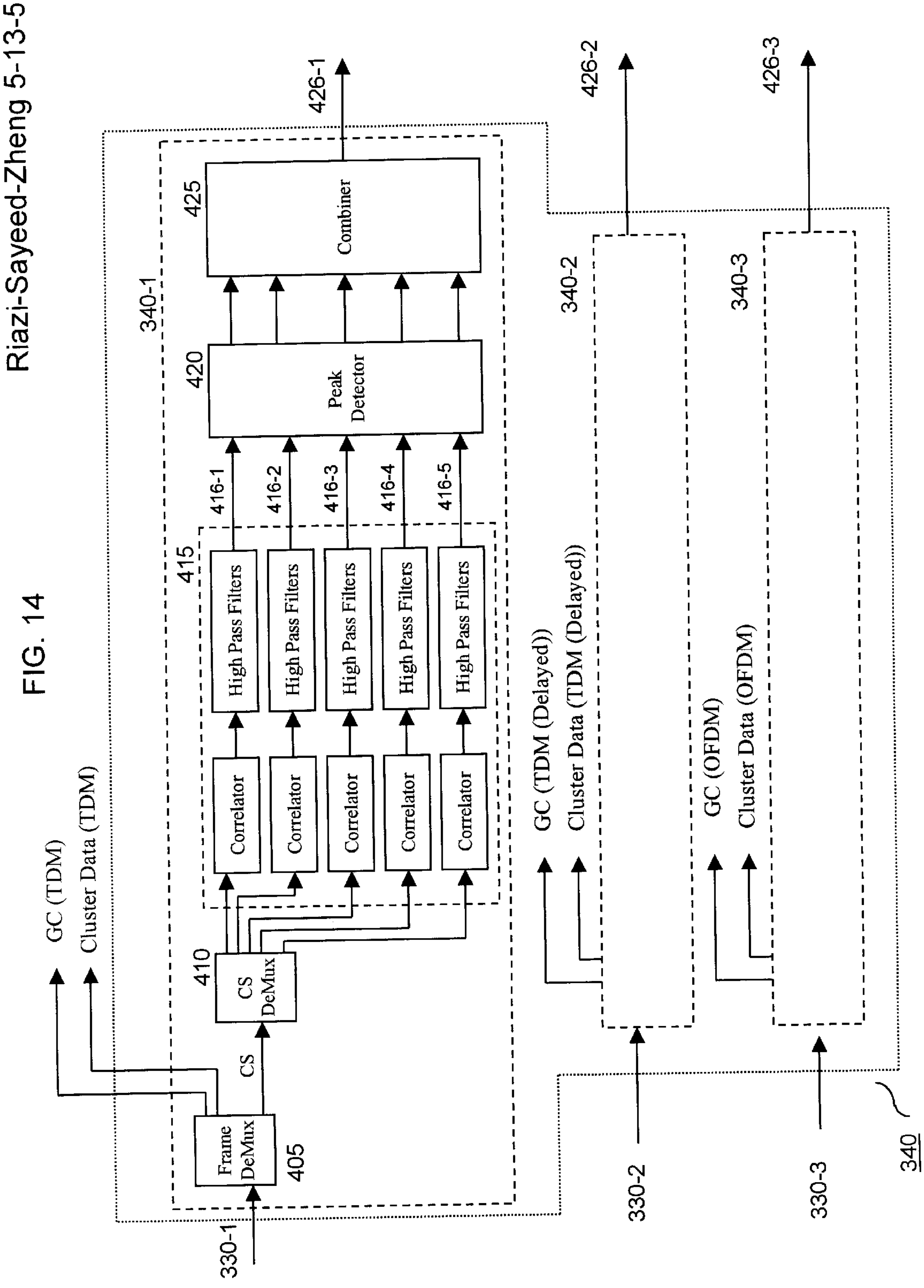
FIG. 14 shows an illustrative block diagram of a demultiplexer in accordance with the principles of the invention.

(As can be observed from FIG. 14, the output signal of each correlator is also filtered by a high pass filter element to improve performance. Each high-pass filter eliminates any low frequency components due to fading effects of a wireless channel.)

The synchronization position for a particular cluster is determined from the peak of the correlation result. Again, it should be noted that an identical cluster synchronization word is used for all five clusters and CS bits for each cluster are inserted every TDM frame or OFDM symbol alternatively from cluster 1 to cluster 5 across the transmission frame. Thus, it is possible to uniquely determine the synchronization position for each individual cluster from the relative phases of five correlation peaks. As such, the five output signals from correlator element 415 are applied to peak detector 420, which finds the first five consecutive peaks and then compares the phases of these first five consecutive peaks to each other. This is shown in FIG. 15.

Figure 15:
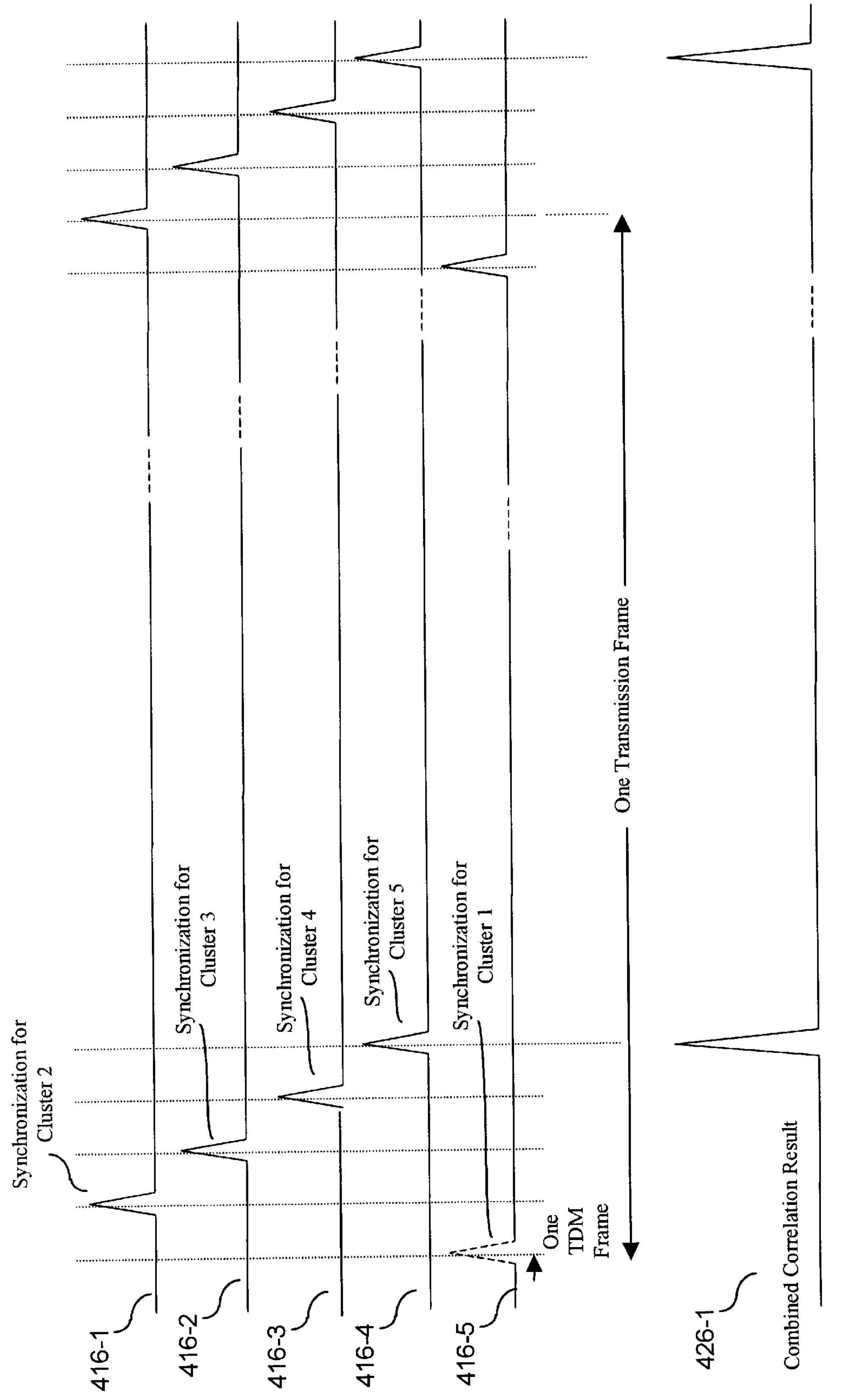
FIG. 15 illustrates cluster synchronization correlation.

As shown in FIG. 15, the five output signals from correlation element 415 are 416-1, 416-2, 416-3, 416-4, and 416-5. As can be observed from FIG. 15, the relative phases of the first five consecutive correlation peaks indicate the cluster position. In this example, output signal 416-1 corresponds to synchronization for cluster 2 (i.e., it occurs second), output signal 416-2 corresponds to synchronization for cluster 3 (i.e., it occurs third), output signal 416-3 corresponds to synchronization for cluster 4 (i.e., it occurs fourth), output signal 416-4 corresponds to synchronization for cluster 5 (i.e., it occurs fifth), and output signal 416-5 corresponds to synchronization for cluster 1 (i.e., it occurs first).

Moreover, to improve the cluster synchronization detection probability and reduce false alarm probability, the five cluster correlation results can be aligned with peak in time and combined. This is performed by combiner 425, which receives the first five consecutive correlation peaks from peak detector 420 and provides combined signal 426-1 as shown in FIG. 15. The combining of the five correlation results provides about five-fold of peak to noise ratio, thus improve the performance significantly. (It can be observed from FIG. 15, that signal 426-1 is simply the combination of the last detected input signal (here, represented by signal 416-4) with the remaining input signals, each of which are shifted in time (by combiner 425) to perform the combination.)

In this example, combined signal 426-1 represents the detection of the peak for the TDM transmission. In a similar fashion, the remaining elements of DeMux 340, i.e., elements 340-2 and 340-3, provide combined signals 426-2 and 426-3, which are estimates of synchronization position associated with the TDM (delayed) transmission and the OFDM transmission, respectively.

Figure 16:
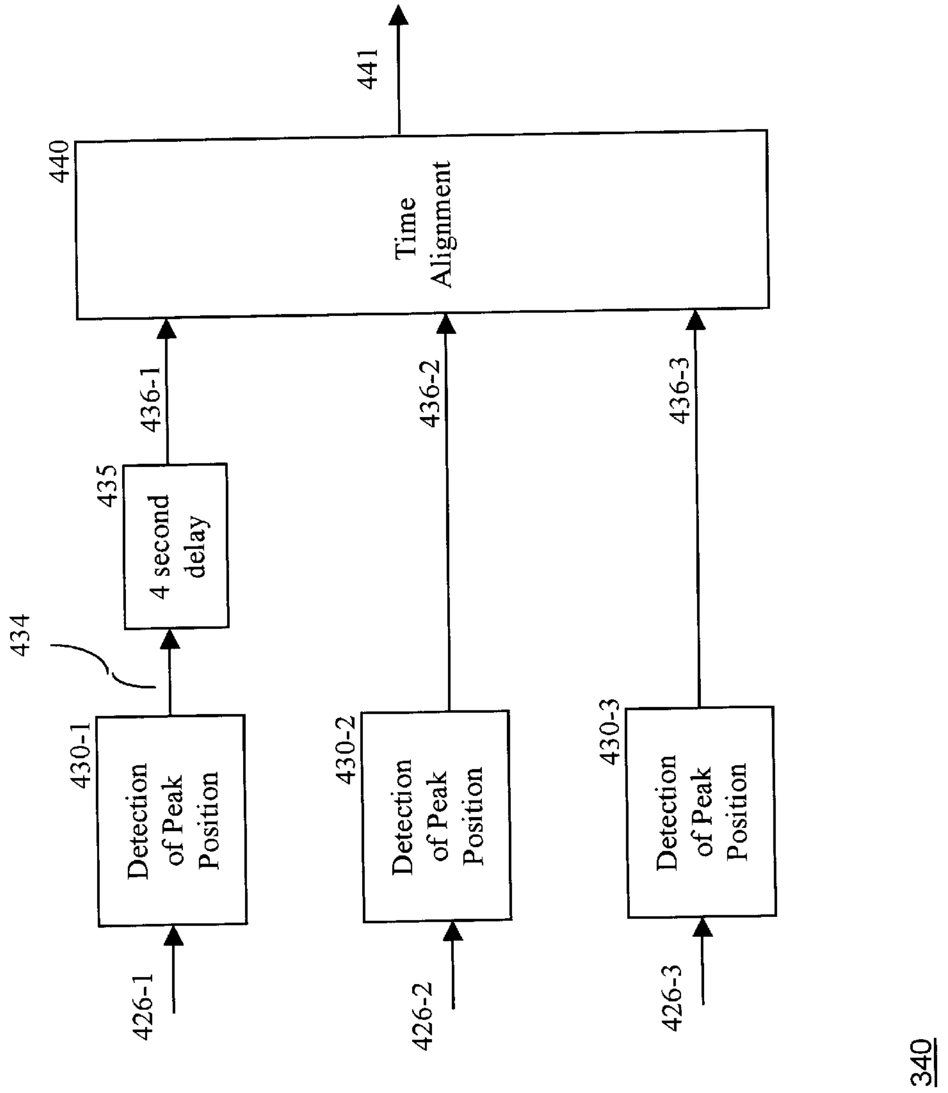
FIGS. 16–19 illustrate various other applications for cluster synchronization.
Figure 17:
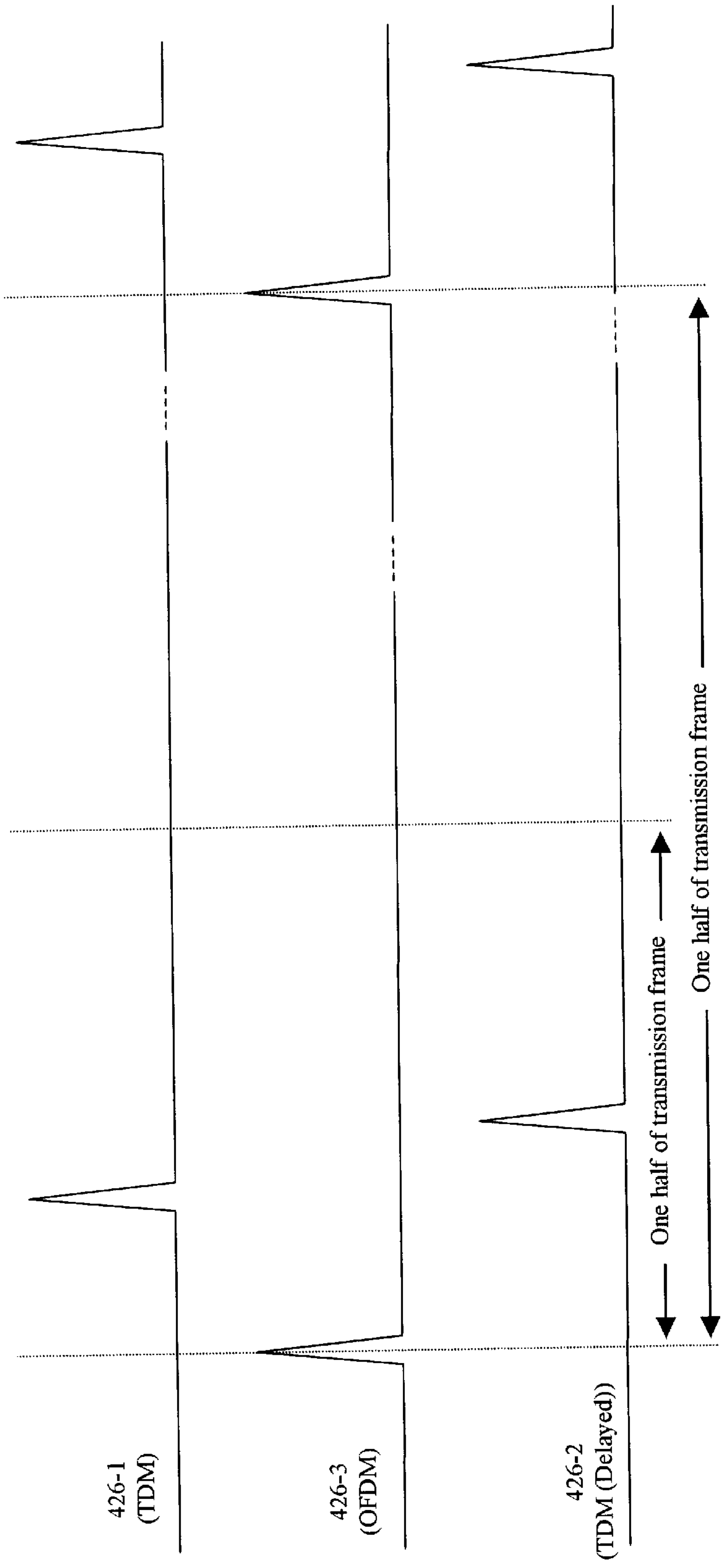

As shown in FIG. 16, the estimate of synchronization position signals 340-1, 340-2, and 340-3 can be used to time align the data streams of the three transmission paths. This is useful if maximal ratio combining is used as disclosed in the above-mentioned co-pending, commonly assigned, U.S. Patent application of Riazi, Sayeed, and Zheng, entitled "Maximal Ratio Combining Scheme for Satellite Digital Audio Broadcast System with Terrestrial Gap Fillers." In this case, DeMux 340 may additionally include elements 430-1, 430-2, and 430-3, which operate on respective estimate of synchronization position signals 340-1, 340-2, and 340-3 for detecting the peak positions for each transmission path. (These elements can also be external to DeMux 340.) The output signals from elements 430-1, 430-2 and 430-3 are applied to time alignment element 440. (It should be noted that the output signal from element 430-1 is first applied to 4 second delay element 435.) FIG. 17 shows an illustration for the time alignment of the three transmission paths performed by time alignment element 440. The alignment process is first to find the three peaks within one half length of transmission frame window, and then use the relative differential delays to control time alignment for the three transmission paths.

Figure 18:
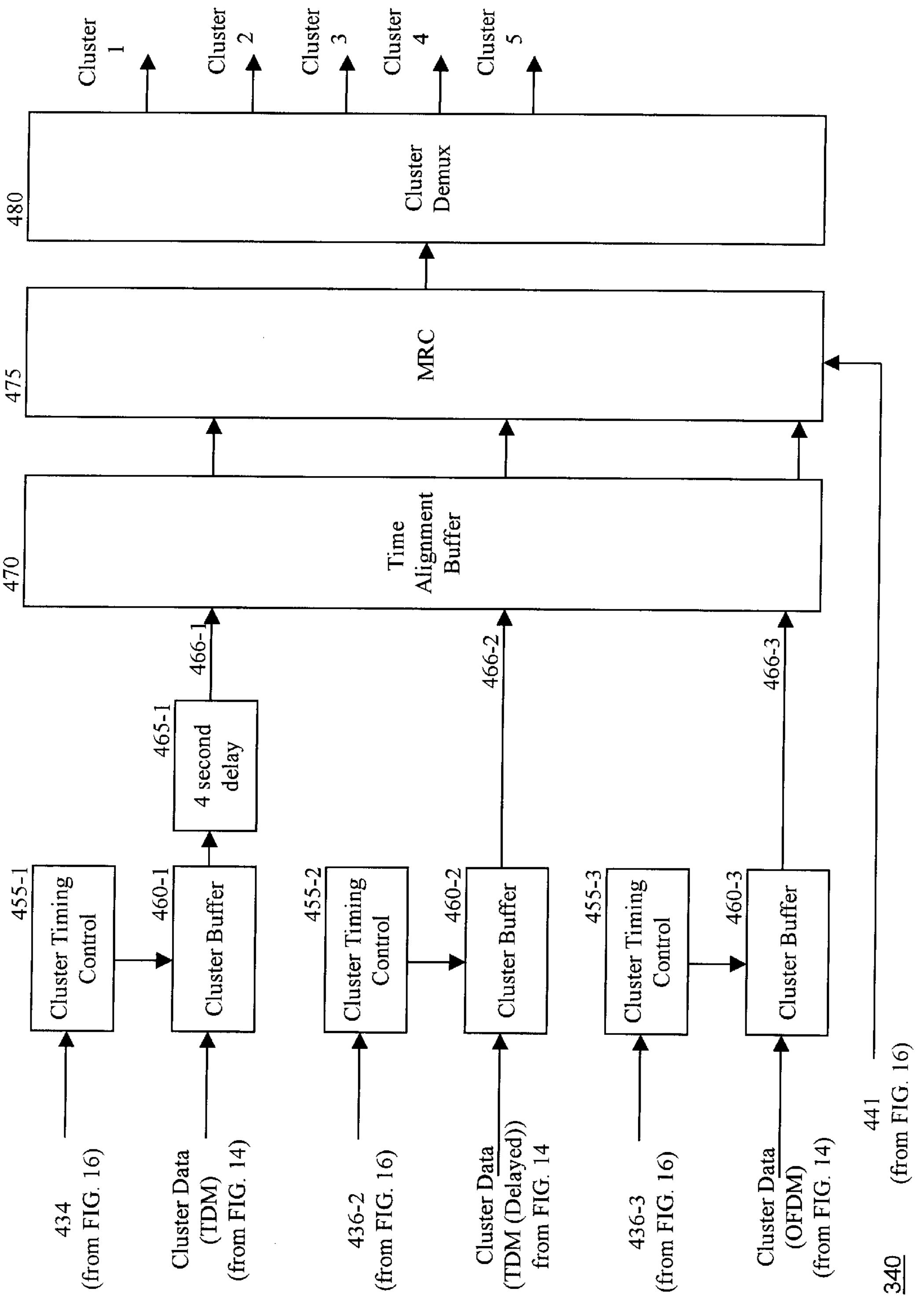
Figure 19:
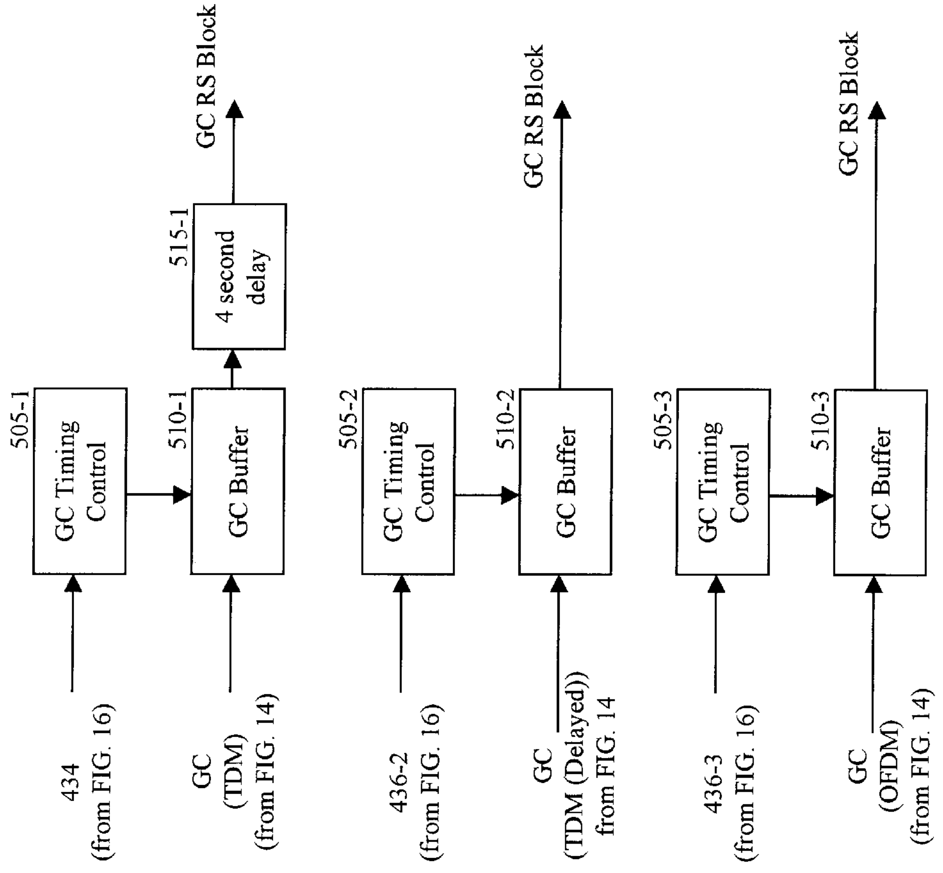

In particular, FIGS. 18–19 show some additional applications of cluster synchronization. Again, for simplicity it is assumed that the elements of FIGS. 18–19 are a part of DeMux 340. In FIG. 18, cluster synchronization is used to time align the cluster portion of the three transmissions. Each cluster synchronization signal is applied to a respective timing control element (e.g., 455-1, 455-2, and 455-3) which adjusts buffer size for the associated cluster buffer (e.g., 460-1, 460-2, and 460-3). Each cluster data stream from a particular transmission is applied to a respective cluster buffer (e.g., 460-1, 460-2, and 460-3). The output streams from each cluster buffer is applied to time alignment buffer 470, which time aligns signals 466-1, 466-2 and 466-3. (It should be noted that the output signal from cluster buffer 460-1 is additionally applied to 4 second delay element 465-1 before application to time alignment buffer 470.) Time alignment buffer 470 provides three time-aligned signals to MRC (maximal ratio combining) element 475, which combines the three signals using maximal ratio combining, e.g., using signal-to-noise ratio (SNR) strengths as weighting factors for each respective stream. (For example, if the TDM (delayed) transmission path has a low SNR, the time aligned signal corresponding to the TDM (delayed) transmission path is weighted less when combining the three transmission paths. Also, the reader may refer to the above-reference patent application entitled "Maximal Ratio Combining Scheme for Satellite Digital Audio Broadcast System with Terrestrial Gap Fillers.") The output signal from MRC 475 is applied to cluster demultiplexer (demux) 480, which demultiplexes the cluster data stream into 5 clusters. Similar comments exist with respect to FIG. 19, which illustrates the use of cluster synchronization with respect to the global information channel.

The foregoing merely illustrates the principles of the invention and it will thus be appreciated that those skilled in the art will be able to devise numerous alternative arrangements which, although not explicitly described herein, embody the principles of the invention and are within its spirit and scope. For example, the inventive concept is not limited to application in a satellite digital audio radio system (SDARS).

What is claimed is:

1. A method for use in a transmitter, the method comprising the steps of processing N program channels into M clusters of program channels, such that at least k programs channels are grouped in each cluster, where k>1; M>1, and (M)(k)<N; and transmitting a transmission signal representing the M clusters and including cluster synchronization information for each of the M clusters such that the cluster synchronization information for each cluster is identical, wherein the identical cluster synchronization information is represented by a maximal length PN (pseudo-random number) sequence.

2. The method of claim 1 further comprising the step of using an eight-stage linear feedback shift register for generating the maximal length PN sequence prior to the transmitting step.

3. A method for use in a receiver, the method comprising the steps of receiving a signal representing (a) M clusters of program channels, such that at least k programs channels are grouped in each cluster, where k>1; M>1, and (b) cluster synchronization information for each cluster of the M clusters, wherein the cluster synchronization information for each cluster of the M clusters is identical; and using the received cluster synchronization information for identifying individual ones of the M clusters of program channels, wherein the identical cluster synchronization information is represented by a maximal length PN (pseudo-random number) sequence.

4. The method of claim 3, wherein the using step includes the steps of:

correlating cluster synchronization information for each cluster for providing correlation data for each cluster; and comparing phases of the correlation data for each cluster for identifying the individual ones of the M cluster of program channels.

5. The method of claim 4 further comprising the step of combining the correlation data for each cluster for providing a cluster synchronization signal.

6. A method for use in a receiver, the method comprising the steps of demodulating a signal to provide a baseband signal representing a transmission frame comprising clusters of data and, for at least two of the clusters, further comprising cluster-specific synchronization data and wherein values of the cluster specific synchronization data is the same for the at least two of the clusters; and using the cluster specific synchronization data to identify individual ones of the clusters of data, wherein the value of the cluster-specific synchronization data, which is the same for the at least two of the clusters, is represented by a maximal length PN (pseudo-random number) sequence.

7. The method of claim 6, wherein the using step includes the steps of:

correlating the cluster-specific synchronization data for the at least two clusters for providing correlation data for the at least two clusters; and comparing phases of the correlation data for the at least two clusters for identifying the individual ones of the clusters of data.

8. The method of claim 7, further comprising the step of combining the correlation data for the at least two clusters for providing a cluster synchronization signal.

9. Transmitter apparatus comprising: a transmission frame assembler for forming a signal representing M clusters of program channels, such that at least k programs channels are grouped in each cluster, where k>1; M>1, and further representing cluster synchronization information for each of the M clusters such that the cluster synchronization information for each cluster is identical; and transmitting the signal, wherein the identical cluster synchronization information is represented by a maximal length PN (pseudo-random number) sequence.

10. The apparatus of claim 9 further comprising an eight-stage linear feedback shift register for generating the maximal length PN sequence.

11. A receiver comprising: means for receiving a signal representing (a) M clusters of program channels, such that at least k programs channels are grouped in each cluster, where k>1; M>1, and (b) cluster synchronization information for each cluster of the M clusters, wherein the cluster synchronization information for each cluster of the M clusters is identical; and means for using the received cluster synchronization information for identifying individual ones of the M clusters of program channels, wherein the identical cluster synchronization information is represented by a maximal length PN (pseudo-random number) sequence.

12. The receiver of claim 11, wherein the means for using further comprises:

means for correlating cluster synchronization information for each cluster for providing correlation data for each cluster; and means for comparing phases of the correlation data for each cluster for identifying the individual ones of the M cluster of program channels.

13. The receiver of claim 11 further comprising a means for combining the correlation data for each cluster for providing a cluster synchronization signal.

14. A receiver comprising: a demodulator, responsive to a signal, that provides a baseband signal representing a transmission frame comprising clusters of data and, for at least two of the clusters, further comprising cluster-specific synchronization data and wherein values of the cluster-specific synchronization data is the same for the at least two of the clusters; and a detector, responsive to the cluster specific synchronization data, for identifying individual ones of the clusters of data, wherein the value of the cluster-specific synchronization data, which is the same for the at least two of the clusters, is represented by a maximal length PN (pseudo-random number) sequence.

15. The receiver of claim 14 further comprising a plurality of correlators for correlating the cluster-specific synchronization data for the at least two clusters for providing correlation data for the at least two clusters; and wherein the detector compares phases of the correlation data for the at least two clusters for identifying the individual ones of the clusters of data.

16. The receiver of claim 15 further comprising a combiner for combining the correlation data for the at least two clusters for providing a cluster synchronization signal.

* * * * *